United States Patent
Elstner et al.

(10) Patent No.: US 12,313,403 B2
(45) Date of Patent: May 27, 2025

(54) MAT FOR CARRYING OUT A PHOTOGRAMMETRY METHOD, USE OF THE MAT AND ASSOCIATED METHOD

(71) Applicant: rooom AG, Jena (DE)

(72) Inventors: Hans Elstner, Jena (DE); Michael Bicker, Jena (DE); Alexander Ramm, Jena (DE)

(73) Assignee: rooom AG, Jena (DE)

( * ) Notice: Subject to any disclaimer, the term of this patent is extended or adjusted under 35 U.S.C. 154(b) by 29 days.

(21) Appl. No.: 18/082,122

(22) Filed: Dec. 15, 2022

(65) Prior Publication Data

US 2023/0194260 A1  Jun. 22, 2023

(30) Foreign Application Priority Data

Dec. 17, 2021 (DE) .......................... 102021133709.7

(51) Int. Cl.
*G01C 11/02* (2006.01)
*G06T 17/00* (2006.01)
*H04N 9/73* (2023.01)

(52) U.S. Cl.
CPC ............ *G01C 11/025* (2013.01); *G06T 17/00* (2013.01); *H04N 9/73* (2013.01); *G06T 2200/08* (2013.01); *G06T 2210/12* (2013.01)

(58) Field of Classification Search
CPC . G06T 17/00; G06T 2200/08; G06T 2210/12; G01C 11/025; H04N 9/73
See application file for complete search history.

(56) References Cited

U.S. PATENT DOCUMENTS 5,831,621 A * 11/1998 Pito .......................... G06T 17/00
  702/156
6,546,356 B1 * 4/2003 Genest ................. A61B 5/0064
  702/153

(Continued)

FOREIGN PATENT DOCUMENTS

DE   102016125589 A1   6/2018   ............. G01B 11/24
DE   102018129143 A1   5/2020   ............. G01B 11/00
WO   WO2017192888 A1   11/2017  ............... G06K 9/78

OTHER PUBLICATIONS

M. S. C. Mat, J. M. Diah, M. A. M. Din and A. M. Samad, "Data acquisition and representation of leaves using digital close range photogrammetry for species identification," 2014 IEEE 5th Control and System Graduate Research Colloquium, Shah Alam, Malaysia, 2014, pp. 108-113. (Year: 2014).*

(Continued)

*Primary Examiner* — Charles L Beard
(74) *Attorney, Agent, or Firm* — Bodner & Bodner, PLLC; Christian P. Bodner; Gerald T. Bodner

(57) ABSTRACT

A mat for carrying out a photogrammetry method, having an upper side with a scanning surface, on which an object to be captured by means of the photogrammetry method can be placed, wherein a plurality of markers which can preferably be distinguished from one another is arranged on the scanning surface, said markers being detectable when carrying out the photogrammetry method, so as to be used during the creation of a 3D model of the object being captured by means of the photogrammetry method. The invention further specifies the use of the mat for carrying out a photogrammetry method, a computer-implemented method for the photogrammetric creation of a 3D model of an object, and a computer-readable storage medium.

5 Claims, 3 Drawing Sheets

(56) References Cited

U.S. PATENT DOCUMENTS

| | | | | |
|---|---|---|---|---|
| 6,549,639 B1* | 4/2003 | Genest | A61B 5/1074 | 382/285 |
| 6,990,228 B1* | 1/2006 | Wiles | G06T 7/55 | 348/42 |
| 7,046,840 B2* | 5/2006 | Chang | G06T 7/593 | 382/164 |
| 8,908,928 B1* | 12/2014 | Hansen | G06V 40/103 | 382/199 |
| 10,008,040 B2* | 6/2018 | Lam | G06V 40/10 | |
| 10,122,997 B1* | 11/2018 | Sheffield | H04N 13/296 | |
| 10,169,882 B1* | 1/2019 | Tokunaga | G06T 7/60 | |
| 10,325,402 B1* | 6/2019 | Wang | G06T 15/503 | |
| 11,386,611 B2* | 7/2022 | Newman | G06T 7/75 | |
| 11,423,566 B2* | 8/2022 | Mayer | G06T 7/80 | |
| 11,468,651 B2* | 10/2022 | Maezawa | G06T 19/20 | |
| 11,885,612 B2* | 1/2024 | Döge | H04N 13/221 | |
| 2002/0061130 A1* | 5/2002 | Kirk | G06T 7/55 | 382/154 |
| 2003/0066949 A1* | 4/2003 | Mueller | H04N 13/254 | 348/E13.016 |
| 2003/0085890 A1* | 5/2003 | Baumberg | G06T 15/04 | 345/420 |
| 2003/0085891 A1* | 5/2003 | Lyons | G06T 7/55 | 345/420 |
| 2003/0107568 A1* | 6/2003 | Urisaka | G06T 17/00 | 345/419 |
| 2003/0218607 A1* | 11/2003 | Baumberg | G06T 17/10 | 345/419 |
| 2004/0037459 A1* | 2/2004 | Dodge | G06T 17/00 | 382/154 |
| 2004/0155877 A1* | 8/2004 | Hong | G06T 7/11 | 345/419 |
| 2006/0033733 A1* | 2/2006 | Urisaka | G06T 17/00 | 345/419 |
| 2007/0091174 A1* | 4/2007 | Kochi | G01B 11/2545 | 348/135 |
| 2007/0291281 A1* | 12/2007 | Yamaguchi | G01B 11/2518 | 356/601 |
| 2008/0075324 A1* | 3/2008 | Sato | G06T 7/80 | 348/E13.005 |
| 2009/0067706 A1* | 3/2009 | Lapa | G01C 11/025 | 382/154 |
| 2010/0007660 A1* | 1/2010 | Forouhar | G06T 7/55 | 382/154 |
| 2011/0007155 A1* | 1/2011 | Aki | G01B 11/02 | 348/142 |
| 2011/0007326 A1* | 1/2011 | Daxauer | G01B 11/002 | 356/620 |
| 2011/0122231 A1* | 5/2011 | Fujieda | G06T 7/593 | 348/47 |
| 2012/0133761 A1* | 5/2012 | Cho | G01B 11/306 | 348/92 |
| 2013/0286408 A1* | 10/2013 | Castillo | G01B 11/272 | 356/610 |
| 2014/0043328 A1* | 2/2014 | Chen | G06T 17/00 | 345/419 |
| 2014/0111507 A1* | 4/2014 | Kim | G06T 17/00 | 345/419 |
| 2015/0081080 A1* | 3/2015 | Tseng | G06F 30/00 | 700/119 |
| 2015/0287203 A1* | 10/2015 | Baumberg | H04N 23/60 | 382/103 |
| 2016/0067608 A1* | 3/2016 | Yim | A63F 13/53 | 463/31 |
| 2016/0150217 A1* | 5/2016 | Popov | H04N 13/257 | 348/47 |
| 2016/0171703 A1* | 6/2016 | Rhee | H04N 23/60 | 382/154 |
| 2017/0214899 A1* | 7/2017 | Meier | G06T 7/73 | |
| 2017/0221224 A1* | 8/2017 | Domae | H04N 7/183 | |
| 2018/0114363 A1* | 4/2018 | Rosenbaum | G06T 15/04 | |
| 2018/0231371 A1* | 8/2018 | Galin | G01C 11/06 | |
| 2019/0096135 A1* | 3/2019 | Dal Mutto | G06F 18/24765 | |
| 2020/0124406 A1* | 4/2020 | Gorschenew | H04N 17/002 | |
| 2020/0202571 A1* | 6/2020 | Barbour | H04N 17/002 | |
| 2020/0246979 A1* | 8/2020 | Wada | G06T 19/00 | |
| 2020/0372626 A1* | 11/2020 | Dal Mutto | G06T 17/00 | |
| 2021/0225078 A1* | 7/2021 | Matsumoto | G06T 17/00 | |
| 2021/0278908 A1* | 9/2021 | Gafni | G06V 10/7788 | |
| 2021/0345733 A1* | 11/2021 | Maezawa | A43D 1/02 | |
| 2021/0365755 A1* | 11/2021 | Nayak | G06K 7/1417 | |
| 2022/0207255 A1* | 6/2022 | Hashimura | G06K 7/10722 | |
| 2023/0083964 A1* | 3/2023 | Sasahara | G01S 17/89 | 382/154 |
| 2023/0342964 A1* | 10/2023 | Tsutsui | G06T 7/579 | |
| 2023/0356863 A1* | 11/2023 | Zhang | G08G 5/55 | |
| 2024/0369351 A1* | 11/2024 | Wang | G01B 11/022 | |

OTHER PUBLICATIONS

A. HajiRassouliha, E. J. L. P. Tang, A. J. Taberner, M. P. Nash and P. M. F. Nielsen, "A Method for Three-Dimensional Measurements Using Widely Angled Stereoscopic Cameras," 2019 IEEE International Instrumentation and Measurement Technology Conference (I2MTC), Auckland, New Zealand, 2019, pp. 1-5, (Year: 2019).*

* cited by examiner

MAT FOR CARRYING OUT A PHOTOGRAMMETRY METHOD, USE OF THE MAT AND ASSOCIATED METHOD

The invention relates to a mat for carrying out a photogrammetry method according to the subject matter of the patent claims, and the use of said mat for carrying out a photogrammetry method according to the subject matter of the patent claims. The invention further relates to a computer-implemented method for the photogrammetric creation of a 3D model of an object according to the subject matter of the patent claims and to a computer-readable storage medium according to the subject matter of the patent claims.

Photogrammetry refers to methods in which three-dimensional (3D) models of objects are created from photographs or images of said objects. (Digital) photogrammetry involves geometric information on the object to be captured being extracted from two-dimensional photographs. By evaluating photographs from different viewing angles, it is possible to create a 3D model of the object to be captured. The 3D model in this case is a digital model of the captured object which contains object coordinates and information on the surface of the object, such as textures and/or colours.

Photogrammetry has a whole host of applications. The increase in digitization has meant that there is frequently a need for digital 3D models of actual objects to be produced. This enables an accurate spatial impression of the object concerned to be created, without having to transport the object itself.

Methods are already known in the art which allow this kind of creation of a digital 3D model. For example, DE 10 2016 125 589 A1 describes a method and a system for an image data set for photogrammetric 3D reconstruction, in which a photogrammetric method is used. However, methods known in the art are frequently comparatively complex and require a large number of photographs or images of the object being captured, or call for specialized supplementary technology, in order to create a sufficiently accurate 3D model. In addition, the limited accuracy of the photogrammetric capture and the associated limitation in terms of the precision of the digital 3D models is furthermore worthy of improvement, in particular when the objects being captured have a complex geometry. It is frequently necessary, for example, for the 3D model obtained after the photogrammetric method has been carried out to be reworked, in order to achieve a better trueness to the captured object.

There is furthermore a need for known formulations for photogrammetric capture to be developed so that the creation of a 3D model, including of objects with complex geometry, can be carried using traditionally available means, such as normal cameras, while at the same time guaranteeing high quality of the 3D model created.

The present invention is therefore based on the problem of further improving and simplifying the creation of digital 3D models by means of photogrammetry and also thereby improving the accuracy of the 3D model obtained.

The problem is solved by a device according to the patent claims, a method according to the patent claims, and a computer-readable storage medium according to the patent claims. Advantageous developments result from the dependent claims.

In particular the problem is solved by a mat for carrying out a photogrammetry method, having an upper side with a scanning surface, on which an object to be captured by means of the photogrammetry method can be placed, wherein a plurality of markers which can preferably be distinguished from one another is arranged on the scanning surface, said markers being detectable when carrying out the photogrammetry method, so as to be used during the creation of a 3D model of the object being captured by means of the photogrammetry method.

An essential point of the present invention is that the mat according to the invention combines all features which are necessary for a photogrammetric combination of the recorded images and a manual reworking. In particular, the markers provide a reference system for the photogrammetry method on the upper side of the mat. They can be detected when the images are analysed during the photogrammetric method and used in creating the 3D model, in that the fixed spatial arrangement of the markers on the scanning surface of the mat is used as the reference for the photogrammetric method. The clear assignment of the physical markers on the scanning surface to their digital map in the recorded images enables virtually all pixels belonging to the object to be converted into 3D points, as a result of which the resolution of the resulting geometry can be simplified. In this way, the arrangement of the markers on the scanning surface of the mat can be provided for the photogrammetry method in the form of a digital model of the mat. The digital model of the mat preferably comprises precise digital maps of all markers and their precise position on the scanning surface. This makes it easier for the markers, which are captured in the photographs or images of the objects, to be used as the (absolute) reference in the photogrammetry method.

The provision and use of the markers according to the invention on the mat can bring about a huge improvement in accuracy when creating the 3D model, even with photos taken using a normal camera. Since in the images which are captured of the object on the mat as part of the photogrammetry method, a few markers on the mat are always visible, the assignment of the images to one another can be improved spectacularly by means of the markers, as a result of which accuracy is improved when creating the 3D model. For example, multiple images which are contained in a scan of the object being captured for the photogrammetry method can be placed in relation to one another with the help of the markers captured in the images, in particular with regard to the orientation and scaling thereof.

It is particularly advantageous in this case for the markers to be designed to be distinguishable from one another, as this simplifies the assignment of the markers in the different images. The fact that the relative arrangement of the markers on the mat is fixed means that the use of the mat according to the invention in a photogrammetry method causes a significant simplification of the method with a simultaneous improvement in accuracy, since a reference system for the photogrammetry method can be provided merely by laying out the mat and placing the object being captured on said mat. It is not therefore necessary, in particular, for markers to be individually applied in the environment of the object or attached to the object itself, in order to improve the photogrammetric method, but it is nevertheless possible to achieve the improvement and simplification in the photogrammetry method through the use of markers. The mat according to the invention therefore represents a hybrid formulation of marker-based scanning improvement and data reference for the photogrammetry method and a possible reworking of the 3D model. The markers are preferably configured in such a manner that they have rotational symmetry. In this way, the orientation of the markers in the recorded images can always be reliably and clearly identified.

There is, in principle, no specific restriction on the nature of the mat. It is only essential for the markers to be clearly identifiable on the scanning surface of the mat and for an object which is to be captured to be capable of being placed on the mat. The mat is preferably designed as a plastic mat on which the markers are printed, for example. This enables the mat to be rolled up following use and stored in a space-saving manner. The upper side of the mat is preferably provided with a non-slip coating, for example rubber-coated, so as to prevent accidental displacement of the object while the images are being taken. It is particularly preferable for the mat to be formed from wear-resistant rubber or plastic, wherein the material thickness selected is sufficiently great for the mat to be able to be rolled out flat without wrinkling. In a preferred embodiment, the mat is formed from a PVC sheet.

An image within the framework of the present invention refers, in particular, to a photograph of the object being captured which is taken by a user by means of a camera, for example a pocket camera or a digital camera.

In the present case, a scan denotes a data volume which results from the combination of multiple images, wherein the images of the scan can undergo processing during the photogrammetry method. For example, a scan may be the volume of image information which results from the images of a front view and a sideward view of the object. The quantity of single images contained in a scan is generally arbitrary. A scan is therefore not necessarily equivalent to a number of images of the object being captured, but preferably also comprises the result of processing, for example scaling, of a colour comparison, displacement, rotation or a combination of the images in the scan.

The 3D model to be created denotes a three-dimensional digital representation of the object which has been created from the combination of one or multiple scans. The 3D model preferably particularly contains object coordinates and information on the surface of the object, such as textures and/or colour information.

According to a preferred embodiment of the invention, at least one marker has a machine-readable code which is preferably formed by at least one barcode, matrix barcode, QR code, n-bit circle marker, a passer mark and/or a frame mark. This allows clear identification of the marker or markers and therefore makes the assignment of the markers in the various fields easier. The shape and design of the markers is not subject to any specific restriction according to the invention, it is only essential for the markers to be easily identifiable or detectable in the images taken. In a preferred embodiment, one or multiple markers are formed by an n-bit circle marker, so they have a substantially circular outline, within which a digital code is contained, which can be represented by a corresponding pattern of the marker. The markers preferably have a colour which substantially matches the colour of the scanning surface of the mat. If the scanning surface of the mat is white, for example, the markers are preferably black in colour. The stark contrast between the marker and scanning surface makes it easier for the markers to be detected in the images taken.

According to one embodiment, the scanning surface is substantially rectangular or substantially circular, preferably substantially square, more preferably square, in particular with an edge length of at least two metres or more. If the scanning surface takes up the entire upper side of the mat, then the mat itself is substantially rectangular or substantially circular, preferably substantially square, more preferably square, in particular with an edge length of 2 metres or more.

This offers the advantage that the outer dimensions of the mat are known from the edge length or the radius of the mat and are available as a benchmark during reworking. In addition, the size of the mat ensures that sufficient free space is provided on the mat for the object being captured, so that a sufficient number of markers is always visible in the images or photographs of the object.

According to one embodiment of the mat according to the invention, the markers are configured and arranged in such a manner that they can be used to create a bounding box around the object being captured.

A bounding box in this case is a virtual demarcation within the digital 3D model which completely surrounds the 3D model of the object being detected. The bounding box is preferably cuboid. Alternatively, the bounding box is formed by a bounding volume with a more general geometry, for example by a cylindrical shape with any surface area. With the help of the bounding box, it is possible to indicate which parts of the scan belong to the 3D model of the object.

The arrangement of the markers on the scanning surface is not subject to any specific restriction. At least some of the markers, or all markers, are preferably arranged along a first diagonal and a second diagonal of the scanning surface, preferably substantially equidistantly and/or at a fixed distance from one another. This arrangement of the markers is particularly preferred in the case of a mat, the scanning surface of which is rectangular or square. In the case of a substantially circular scanning surface, it is preferable for some of the markers, or all of the markers, to lie on straight lines which run through the midpoint of the substantially circular scanning surface.

In a further embodiment, size references are applied to the scanning surface of the mat. These may be used for scaling and determining the relative positioning of an object to be captured on the scanning surface, while the photogrammetry method is used. In addition, the size references can simplify subsequent modifications of the 3D model. The size references are preferably shaped as preferably linear concentric circles and/or rectangles centred on the midpoint of the scanning surface of the mat. This allows a user to place the object as centrally as possible, or specially positioned in another way, on the mat. Precise knowledge of the positioning in turn allows simpler reworking, as it makes the spatial assignment of different images in relation to one another simpler.

In addition, length scales, for example millimetre scales, may be provided on the upper side of the mat or on the scanning surface as size references. Length scales of this kind are preferably formed on the edges of the scanning surface or of the mat.

The size references and length scales in this case help when checking there has been a true-to-scale capture of the object, particularly during reworking. Length scales in this case have the particular advantage that length measurements can easily be taken from them.

In a further embodiment, colour references are formed on the scanning surface of the mat. These allow there to be a white balance and/or a colour adjustment while the photogrammetry method is being carried out.

Multiple colour references are preferably provided, which are distributed over the scanning surface, in order to ensure the best possible visibility of at least one colour reference in the different images. The colour references preferably comprise two-dimensional colour reproductions of a plurality of colours which are preferably selected in accordance with a known colour standard. This enables the colours of the object to be classified in the images of the scan on an objective scale.

In addition, according to a further embodiment, angle markings are formed on the scanning surface of the mat, which make it possible to determine angles of the positioning of the object. The angle markings are preferably in the form of lines extending from a midpoint of the scanning surface of the mat in a radial direction, which lines are at a fixed angle to one another.

The angle markings make it easier for the orientation and positioning of the object in different images to be compared with one another by determining an angle between a reference line on the scanning surface and a feature of the object, for example. The angle markings can also be used to determine the position of the camera relative to the object when creating the images.

It is further preferable for at least one directional marking to be formed on the scanning surface which indicates a direction on said scanning surface. The at least one directional marking may be formed by an arrow, for example. In order to ensure the visibility of the directional marking in a largest possible number of images taken, multiple directional markings can be created on the scanning surface, which are preferably all aligned parallel to one another or all indicate the same direction on the scanning surface. This provides an absolute direction on the scanning surface for the photogrammetry method. Since in photogrammetry methods, it is frequently not possible for absolute rotations to be captured and also the arrangement of the markers can be rotated at random without specifying a directional reference in space, the provision of the at least one directional marking makes it easier to determine an absolute direction as the reference for the photogrammetry method. In this way, the creation of the 3D model can be further simplified and improved in terms of accuracy.

As an additional aid for the user, instructional steps can also be printed on the mat, which provide guidance on how the method unfolds. These may, in particular, contain instructions and examples of the directions from which a number of photos are to be taken, which light conditions are to be guaranteed, and the like.

The problem according to the invention is further solved by a computer-implemented method for the photogrammetric creation of a 3D model of an object, preferably using the mat described above, comprising the following steps:
placement of an object to be captured on a scanning surface of a mat with markers which are preferably designed to be distinguishable;
photographing of the object from a plurality of different directions, in order to create images of the object and at least some of the markers on the scanning surface;
scaling of one or more of the images with the help of an adjustment of the captured images, using the markers captured in the images;
creation of a 3D model of the object based on the processed images.

Using the method according to the invention, the same advantages can be achieved as those described above in relation to the mat according to the invention. Features of the mat, in particular functional features of the structural elements of the mat, can be transferred to the method according to the invention as method steps.

Likewise, features of the method according to the invention can be transferred to the mat according to the invention, in that said mat is designed in such a manner that it is designed and suitable for the implementation of the corresponding method features. In the same way as the mat according to the invention is preferably designed and used in order to carry out the method as described above according to the invention, it is preferable for the method according to the invention to be carried out using a mat according to the invention. The present invention further comprises the use of the mat according to the invention in order to carry out a photogrammetry method.

According to a preferred embodiment, the method comprises the provision of a digital model of the mat, containing information on the arrangement of the markers on the scanning surface of the mat. The digital model of the mat preferably comprises precise digital images of all markers and their exact position on the scanning surface. The digital model of the mat is taken into account during the photogrammetric creation of the 3D model of the object. This makes it easier for the images to be compared and increases the precision of the photogrammetric method, since the positions of the markers in the images can be compared with the absolute information on the arrangement or positions of the markers in the digital model. The step of scaling one or more of the images preferably comprises a comparison of the positions of the markers captured in the images with the digital model of the mat, in order to increase the accuracy of the method. In addition, the provision of the digital model of the mat for each image created allows the orientation and positioning of the camera relative to the mat to be determined when creating images, since with the help of the markers captured in the respective image, by comparing with the digital model of the mat, the position of the camera relative to the mat can be determined, for example by means of triangulation.

The method preferably comprises the creation of a bounding box around the object in the 3D model. The creation of the bounding box preferably involves taking account of the markers captured in the images, more preferably taking account of size references on the scanning surface, more preferably by means of a comparison between the images captured and the digital model of the mat.

It is furthermore preferable for the method to comprise the implementation of a white balance and/or a colour adjustment of the images. The white balance and/or the colour adjustment of the images preferably take place while taking account of colour references applied to the scanning surface of the mat. The comparison preferably involves comparing the images of the colour references in the images with colour reference information which is contained in the digital model of the mat.

According to a further preferred embodiment, the placement of the object being captured on the scanning surface of the mat comprises a placement of one or multiple transparent spacers on the mat, on which the object is placed in such a manner that the spacers are arranged between the mat and the object.

The use of transparent spacers offers multiple advantages. On the one hand, the object is placed in a raised position on the mat through the use of spacers. This means that images of the object can also be taken from below. The transparent spacers are not captured in the photogrammetric method due to their transparency and they do not therefore appear as artefacts in the 3D model. In addition, due to the fact that the spacers are transparent, a larger area of the scanning surface is visible in the images, so that a greater number of markers, size references, colour references and/or angle markings can be taken into account when evaluating the images in the photogrammetry method.

The spacers are made of a transparent material, for example plexiglass, and are preferably cylindrical, rectangular or cuboid.

Within the framework of the present invention, a computer-readable storage medium is further specified, which contains instructions that cause the at least one processor to implement the method described above, when the instructions are carried out by the at least one processor.

The invention is also described below with regard to further details, features and advantages, which are explained in greater detail with the help of the figures. The features and combinations of features described, as shown below in the figures of the drawing and described with the help of the drawing, can not only be used in the respective combination indicated, but can also in other combinations or in isolation, without thereby departing from the framework of the invention.

IN THE DRAWING

The figures are only schematic in nature and are used simply for understanding the invention. The same kinds of elements are provided with the same reference signs in the description of the exemplary embodiments.

Figure 1:
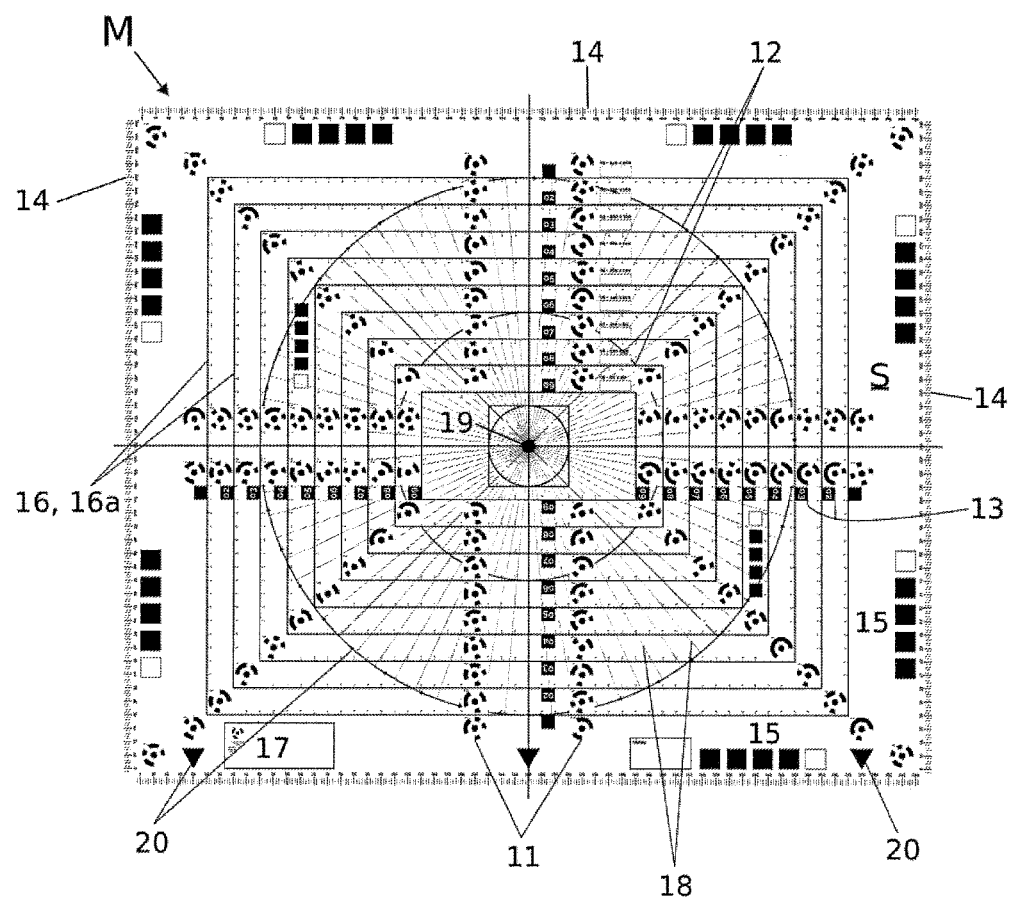
FIG. 1 shows a plan view of the mat according to an exemplary embodiment of the invention.

FIG. 1 shows a plan view of the mat M according to an exemplary embodiment of the invention. The mat M in this exemplary embodiment has a substantially quadratic shape. On its surface, the mat M has a scanning surface S which takes up the entire upper side of the mat M in the present exemplary embodiment. The scanning surface S has a plurality of markers 11, which have circular 12-bit markers in the present exemplary embodiment and are distributed over the scanning surface of the mat. The markers 11 have no rotational symmetry, which makes it easier to identify the orientation of the mat. Furthermore, the scanning surface S has multiple concentric size references 16 in the form of concentric rectangles, and coloured labels 13 and concentric circles 12, which are used as size and positional references. Further measures 16a which make it easier to identify sizes when implementing a photogrammetry method using the mat M are located along the rectangular size references.

Along the outer edges of the mat M are located rulers 14 which likewise provide a size ruler. In the present exemplary embodiment, the rulers 14 are designed as length scales. In addition, colour markings 15 which allow a subsequent colour adjustment or white balance are distributed over the scanning surface S. Furthermore, angle markings 18 are printed through the midpoint 19 of the scanning surface S, which are at a known angle to one another. This makes it easier for relative or absolute angular relationships to be determined when images of an object O are taken from different angles. Also shown is an overprint with a guide 17 for the user. In addition, directional arrows 20 are formed on the scanning surface S, which indicate the orientation of the mat M as a whole. The directional arrows 20 may also be applied to the size references 12 or to other size references (not shown), in order to provide an orientation guide.

The mat M is provided for use in a photogrammetric method. In this case, an object O, of which a 3D model is to be created by means of photogrammetry, is placed on the scanning surface S of the mat M. The placement preferably takes place in such a manner that the object O is placed as centrally as possible on the scanning surface S. It is thereby ensured that the largest possible area of the scanning surface S is visible from all viewing directions. The object O placed on the scanning surface S is then photographed from a plurality of different directions. In this way, images of the object O are created, on which at least some of the markers 11 are visible on the scanning surface S of the mat M. The images create a scan of the object O. Further reference variables of the scanning surface, such as the size references 12, 16, the rulers 14, 16a, the colour markings 15, the angle markings 18 and/or the directional arrows 20, can preferably be seen in at least some of the images. The images taken from different directions or perspectives are then scaled in relation to one another. For scaling, the markers 11 of the scanning surface S are used in the images. In addition, at least some of the reference features of the scanning surface S, in other words the size references 12, 16, the rulers 14, 16a, the colour markings 15, the angle markings 18 and/or the directional arrows 20, are preferably used to scale and/or adjust the images in respect of one another. Based on the images scaled and/or adjusted in respect of one another, a 3D model of the object O can then be created by means of photogrammetry.

Figure 2:
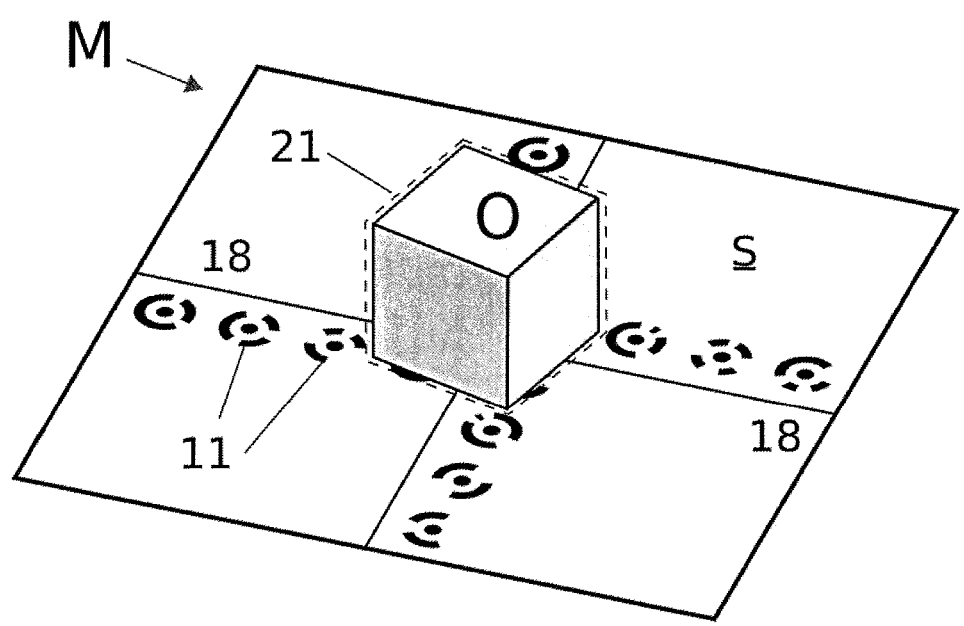
FIG. 2 shows a schematic perspective view of an exemplary embodiment of the mat with an object placed thereupon, in which a bounding box is depicted.

FIG. 2 shows a perspective view of a mat M according to a further exemplary embodiment of the invention, on which an object O is placed. Also drawn in is a bounding box 21, which makes it possible for a 3D model of the object O to be demarcated against the background in a scan. The bounding box 21 in this case can be determined taking account of, for example, the cover of the different markers 11 in the images of a scan. The creation of the bounding box 21 in this case can preferably be taken over automatically by photogrammetry software. The bounding box 21 around the object O may, however, also be created manually by the user in one or multiple images. The closer to the object O the bounding box 21 is defined in this case in the plurality of images taken, the more efficient the subsequent compilation of the images into a model. In particular, an accurate determination of the bounding box 21 also reduces the work involved in the manual reworking of the images which may be necessary.

Figure 3:
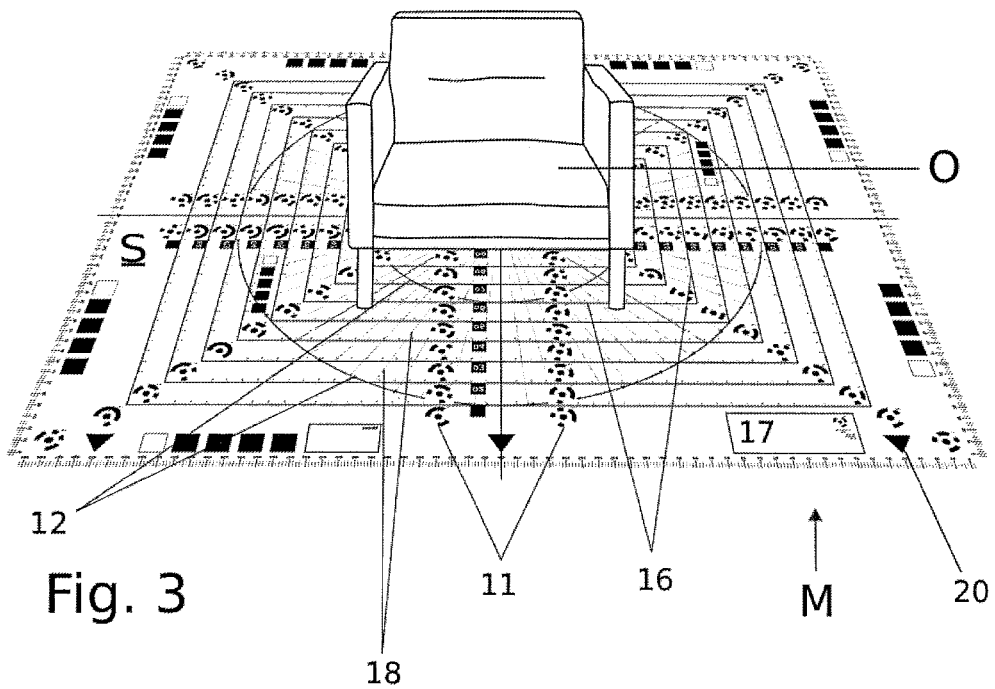
FIG. 3 shows a perspective view of the mat according to an exemplary embodiment of the invention with the object situated thereupon.

FIG. 3 shows a perspective view of a mat M on which an object O is placed, according to a further exemplary embodiment. An object O which is to be captured by means of photogrammetry is arranged on the scanning surface S. With the help of the concealed, or partially concealed, markers 11, the outlines of the object O can be accurately captured. With the help of the size references 16, or 12, a subsequent scaling of the images within the scan in relation to one another is possible with a substantially reduced amount of work. The directional arrows 20, optionally along with the angle markings 18, can thereby be used to determine the perspective from which images of the scan are taken.

When performing the method according to the invention, in particular when using the mat M according to the invention, the creation of a 3D model from a plurality of images taken from different perspectives is made substantially easier. The printed guide 17 can preferably provide specifications on the angles from which, or the angle intervals in which, images are to be taken according to the corresponding markings 20 and 18. The mat M according to the exemplary embodiments explained above allows a substantial increase in the accuracy of a 3D model which is to be created. The quality of the 3D model produced depends crucially on the number of identified, common features in different images. Due to inaccuracies, the number of generated 3D points is frequently only a very small fraction of pixels or camera pixels. Due to the provision of the mat M with the features described, an environment for a photogrammetry method can be created without substantial expenditure, which supplies a plurality of different absolute references on account of the features of the mat M, which references can be used in implementing the photogrammetry method, in order to significantly improve the adjustment of the images to one another and therefore the accuracy of the 3D model created.

Figure 4:
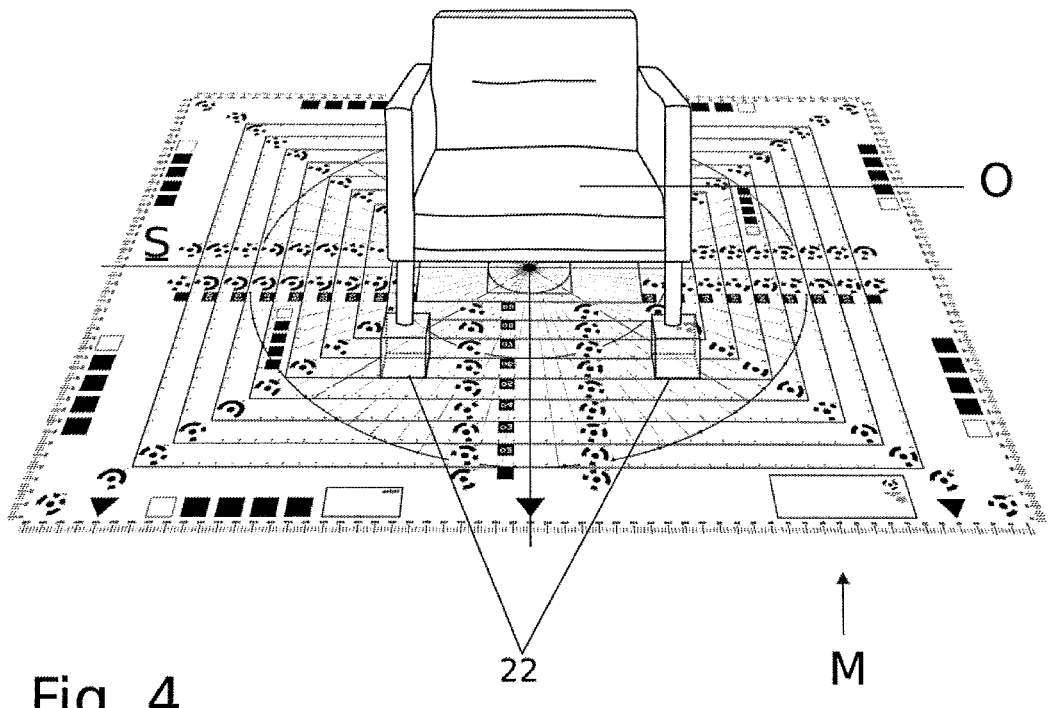
FIG. 4 shows a perspective view of the mat according to an exemplary embodiment of the invention with an object which is arranged on the spacers.

FIG. 4 shows the perspective view of a mat M according to a further exemplary embodiment, on which an object O is placed on spacers 22. The preferably non-slip design of the scanning surface S in this case makes for easier placement of the object O. The object O in this case is partly, or completely, arranged on the spacers 22. The placement of the object on the scanning surface S of the mat M with the spacers 22 interposed also makes it easier for the object to be photographed from a plurality of different directions. In particular, photographs of the underside, or part of the underside of the object O, can thereby also be achieved. The three-dimensional resolution of the 3D model of the object O is thereby improved when the images are compiled into a model. The transparency of the spacers 22 means that they can easily be distinguished from the object O itself, which is advantageous both for the subsequent processing of the images and also for the separation of the spacers 22 from the 3D model of the object O.

LIST OF REFERENCE SIGNS

M mat
S scanning surface
O object
B image
11 marker
12, 16 size references
14, 16a ruler
15 colour markings
17 guide for users
18 angle markings
19 midpoint of the scanning area
20 directional arrows
21 bounding box
22 spacer

The invention claimed is:

1. A computer-implemented method for a photogrammetric creation of a 3D model of an object, using a mat having an upper side with a scanning surface, on which an object to be captured by a photogrammetry method can be placed, wherein a plurality of markers which can be distinguished from one another is arranged on the scanning surface, said markers being detectable when carrying out the photogrammetry method, so as to be used during the creation of a 3D model of the object being captured by the photogrammetry method, wherein at least one marker has a machine-readable code which is formed by a barcode, matrix barcode, QR code, n-bit circle marker, passer mark or frame mark, the method comprising the following steps:
    placement of the object to be captured on the scanning surface of the mat with the markers which are designed to be distinguishable, wherein the placement of the object being captured on the scanning surface of the mat comprises a placement of one or multiple transparent spacers on the mat, on which the object is placed in such a manner that the spacers are arranged between the mat and the object;
    photographing of the object from a plurality of different directions, in order to create captured images of the object and at least some of the markers on the scanning surface;
    scaling of one or more of the captured images with the help of an adjustment of the captured images, using the markers captured in the images; and
    creation of the 3D model of the object based on the captured images.

2. The method according to claim 1, further comprising the step of creating a bounding box around the object in the 3D model.

3. The method according to claim 1, further comprising the step of providing a digital model of the mat, wherein the digital model of the mat is taken into account during the photogrammetric creation of the 3D model of the object.

4. The method according to claim 1, further comprising the step of implementing of a white balance or a colour adjustment of the images with the help of an adjustment of colour references formed on the scanning surface.

5. A computer-readable storage medium and at least one processor, the computer-readable storage medium containing instructions that cause the at least one processor to implement the method according to claim 1, when the instructions are carried out by the at least one processor.

* * * * *